(12) United States Patent
Smith

(10) Patent No.: US 6,966,122 B2
(45) Date of Patent: Nov. 22, 2005

(54) GAUGE FOR MEASURING MOVEMENT OF A POWER TOOL AND DUST COLLECTOR FOR WORK BENCH

(76) Inventor: Darrin Eugene Smith, c/o Jessem Products Ltd., 124 Big Bay Point Road, Barrie, Ont. (CA) L4N 9B4

( * ) Notice: Subject to any disclaimer, the term of this patent is extended or adjusted under 35 U.S.C. 154(b) by 52 days.

(21) Appl. No.: 10/427,920

(22) Filed: May 2, 2003

(65) Prior Publication Data

US 2003/0205292 A1   Nov. 6, 2003

(30) Foreign Application Priority Data

May 2, 2002   (CA)   .................................... 2384550

(51) Int. Cl.[7] .......................... B23B 49/00; B27C 5/02; B27C 5/04; B23C 1/00
(52) U.S. Cl. ................ 33/638; 144/136.95; 144/154.5; 33/642
(58) Field of Search ................ 33/1 N, 1 PT, 33/712, 638, 642, 568, 573; 144/154.5, 135.2, 144/130, 136.95

(56) References Cited

U.S. PATENT DOCUMENTS

| | | | | |
|---|---|---|---|---|
| 2,588,263 A | * | 3/1952 | Matthewman | .................. 76/41 |
| 3,011,411 A | * | 12/1961 | Raymond | ..................... 409/82 |
| 3,884,094 A | * | 5/1975 | Ulmer | .......................... 74/609 |
| 4,186,492 A | * | 2/1980 | Gattesco | ....................... 33/796 |
| 4,581,808 A | * | 4/1986 | Lawson et al. | ................ 29/558 |
| 5,139,061 A | * | 8/1992 | Neilson | .................... 144/135.2 |
| 6,082,011 A | * | 7/2000 | Phillips, III | .............. 33/203.15 |
| 6,089,286 A | * | 7/2000 | Liao | .......................... 144/117.1 |

* cited by examiner

Primary Examiner—Gail Verbitsky
(74) Attorney, Agent, or Firm—Birch, Stewart, Kolasch & Birch, LLP

(57) ABSTRACT

A gauge for measuring the extent of alteration in the level of carriage on which a power tool such as a router or saw is mounted. The carriage is mounted beneath a working surface on which a piece of work is placed. The cutting implement of the power tool such as a bit or blade projects through an opening in the working surface and terminates above the surface. The carriage may be raised and lowered and the gauge records any movement of the carriage. A clutch allows the gauge to be manually adjusted without affecting the level of the carriage. A hollow chamber is mounted beneath the working surface and through which the cutting implement extends. Air within the chamber is evacuated in order to create a vacuum for withdrawing debris resulting from the cutting of the work piece from the area where cutting takes place.

16 Claims, 9 Drawing Sheets

GAUGE FOR MEASURING MOVEMENT OF A POWER TOOL AND DUST COLLECTOR FOR WORK BENCH

BACKGROUND OF THE INVENTION

This invention relates to an apparatus for selectively raising and lowering a power tool located beneath the working surface of a work bench and more particularly to a gauge for measuring the extent of upward and downward movement of a power tool beneath the working surface. The invention also relates to a dust collector for removing debris such as saw dust, wood chips and shavings and other debris which accumulates on the working surface of a work bench.

In U.S. Pat. No. 6,550,154 in which I am named as inventor, I describe an apparatus for selectively raising and lowering a power tool such as a router and a rotary saw mounted beneath the working surface of a work bench. The apparatus has a carriage which is located beneath the working surface and on which the power tool is mounted. The cutting implement of the power tool projects above the surface and into a work piece. The implement may be a bit, where the power tool is a router, or a blade where the power tool is a saw. The carriage is raised and lowered by means of a handle above the working surface. The handle is removable so that once the power tool is in a desired position, the handle is removed so that it does not interfere with the routing or sawing operation. The subject matter of that patent is incorporated into this application by reference.

I have made improvements to the apparatus described in the patent referred to above and the subject matter of this application is directed to those improvements. One improvement is the addition of a gauge for measuring the extent of upward and downward movement or travel of the power tool beneath the working surface. The gauge indicates how far the carriage has travelled up or down and serves as means for measuring any change in the level of the carriage caused by the handle.

Another improvement to which the subject application is directed is a dust collector mounted beneath the working surface and surrounding the bit or saw blade. The dust collector serves to remove debris such as sawdust, wood chips, and shavings which is generated during routing or sawing and the dust collector so that the debris does not interfere with such operations. The dust collector is suitable for use not only in conjunction with the apparatus described in the patent referred to above but in conjunction with any power tool mounted beneath a working surface.

SUMMARY OF THE INVENTION

The gauge of my invention is operatively connected to the apparatus for raising and lowering the carriage and measures the extent of alteration in the level of the carriage. There is a clutch for selectively connecting and disconnecting the gauge and the apparatus such that when the gauge is manually rotated, it is disconnected from the apparatus but when the apparatus is activated, the gauge is connected to it.

The dust collector includes a hollow chamber mounted beneath the working surface of a work bench and through which a cutting implement such as a bit or a rotary saw extends. The dust collector includes vacuum means for withdrawing air from the chamber with resulting withdrawal of debris resulting from the cutting of a work piece on the working surface.

DESCRIPTION OF THE DRAWINGS

The improvements of the subject application are described in detail with reference to the accompanying drawings in which.

Like reference characters refer to like parts throughout the description of the drawings.

DESCRIPTION OF THE PREFERRED EMBODIMENTS

Figure 1:
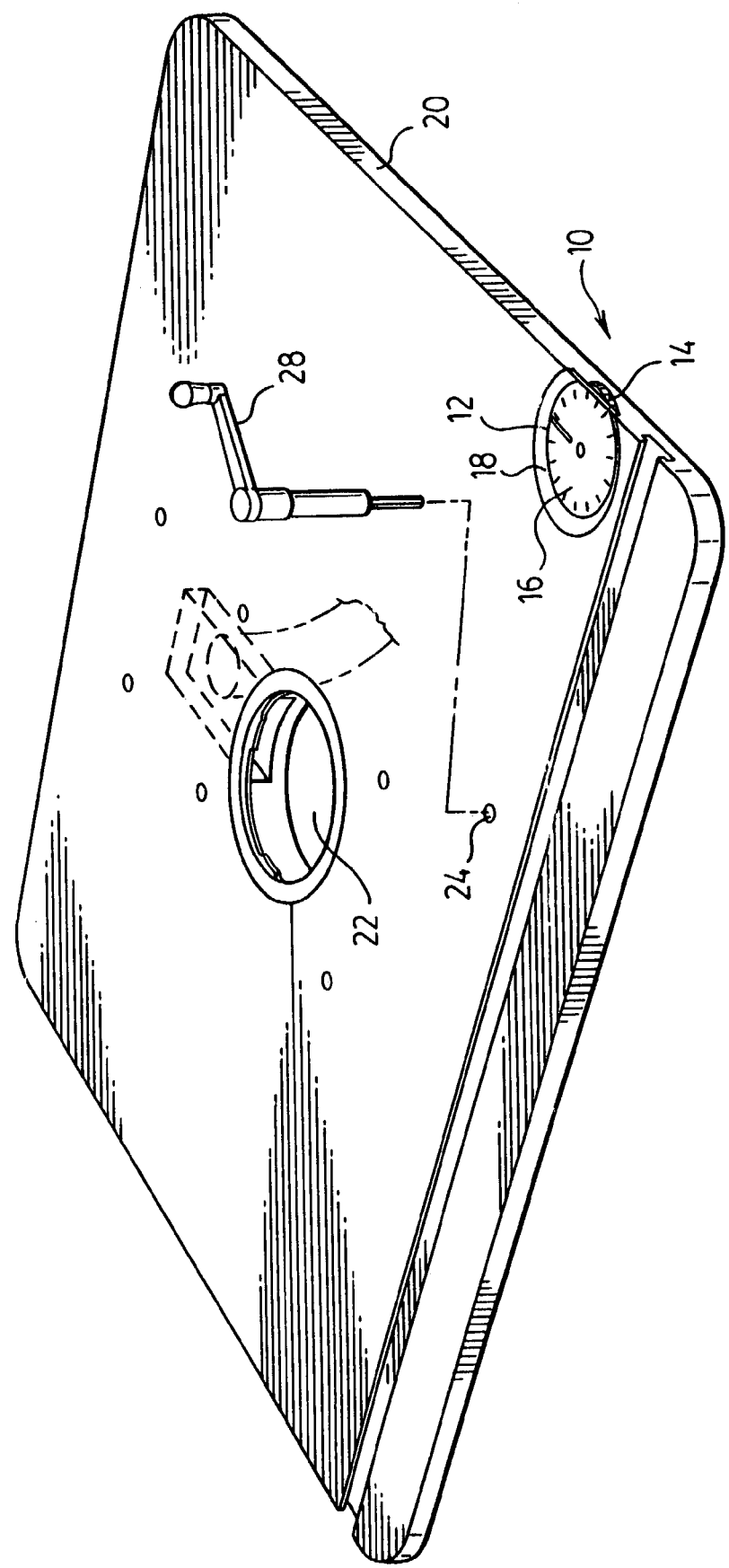
FIG. 1 is a perspective view of the working surface of a work bench in conjunction with a dial of the gauge of the invention.

With reference to FIG. 1, the gauge of the invention, indicated generally 10, includes a circular dial 12 having a knurled outer edge 14. A scale is etched or painted onto the upper surface 16 of the dial and the dial is mounted in a recess 18 of a plate 20 having an upper working surface on which a piece of work or stock (not illustrated) is placed.

The plate has a first aperture 22 through which an implement (not illustrated) for cutting the work piece extends. The cutting implement may be a bit if the tool is a router or a blade if the tool is a saw.

Figure 3:
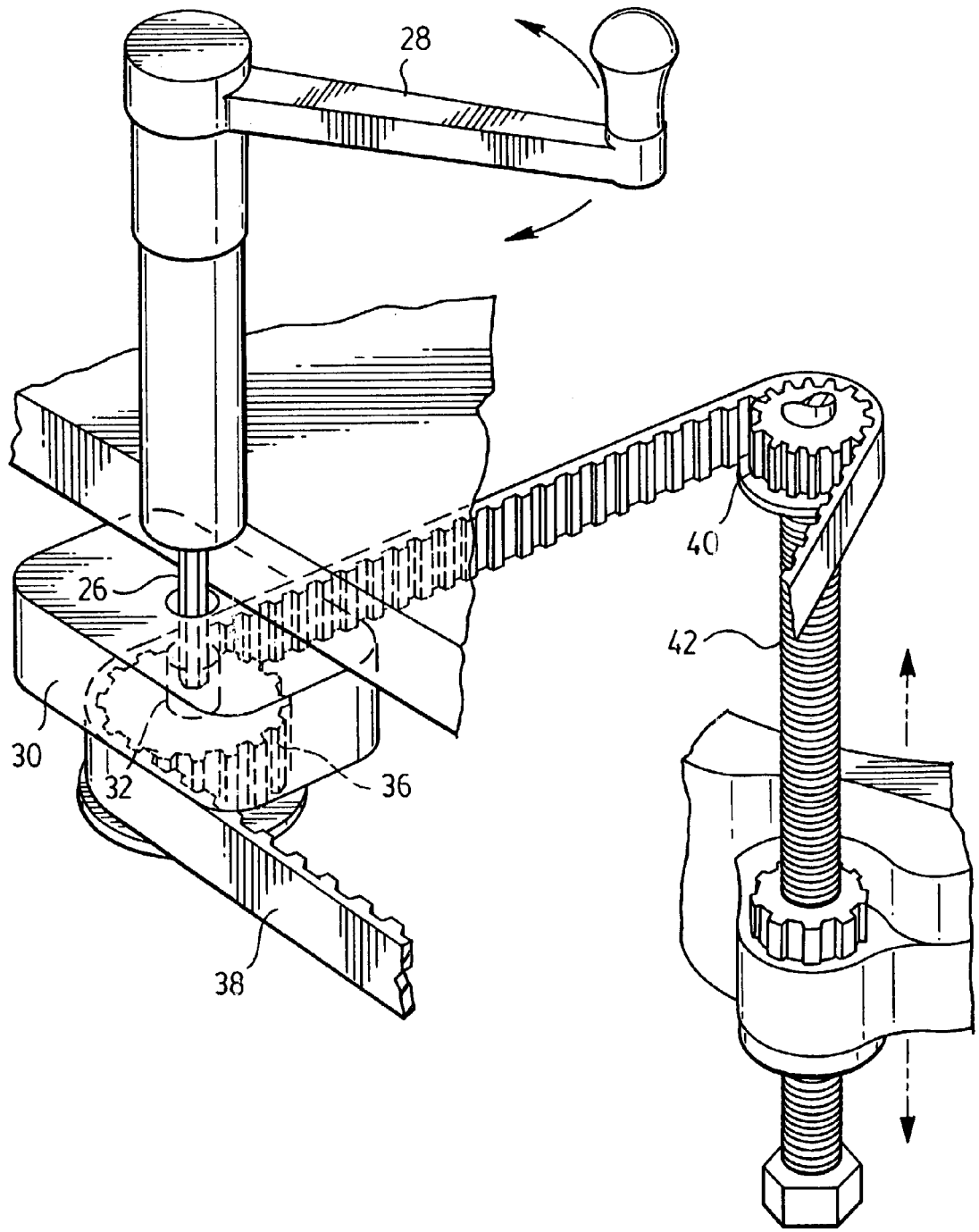
FIG. 3 is a perspective view of the mechanism for adjusting the level of a power tool as described in the patent referred to above.

With reference to FIGS. 1 and 3, the plate has a second aperture 24 through which the hexagonal stem 26 of a handle 28 extends. The stem extends into a block 30 which is attached to the lower wall of the plate. A tube 32 is rotatably mounted in the block and has a central hexagonal opening which receives the stem. The outer wall of the hexagonal stem frictionally mates with the tube opening so that rotation of the handle causes a like rotation of the tube.

Figure 2:
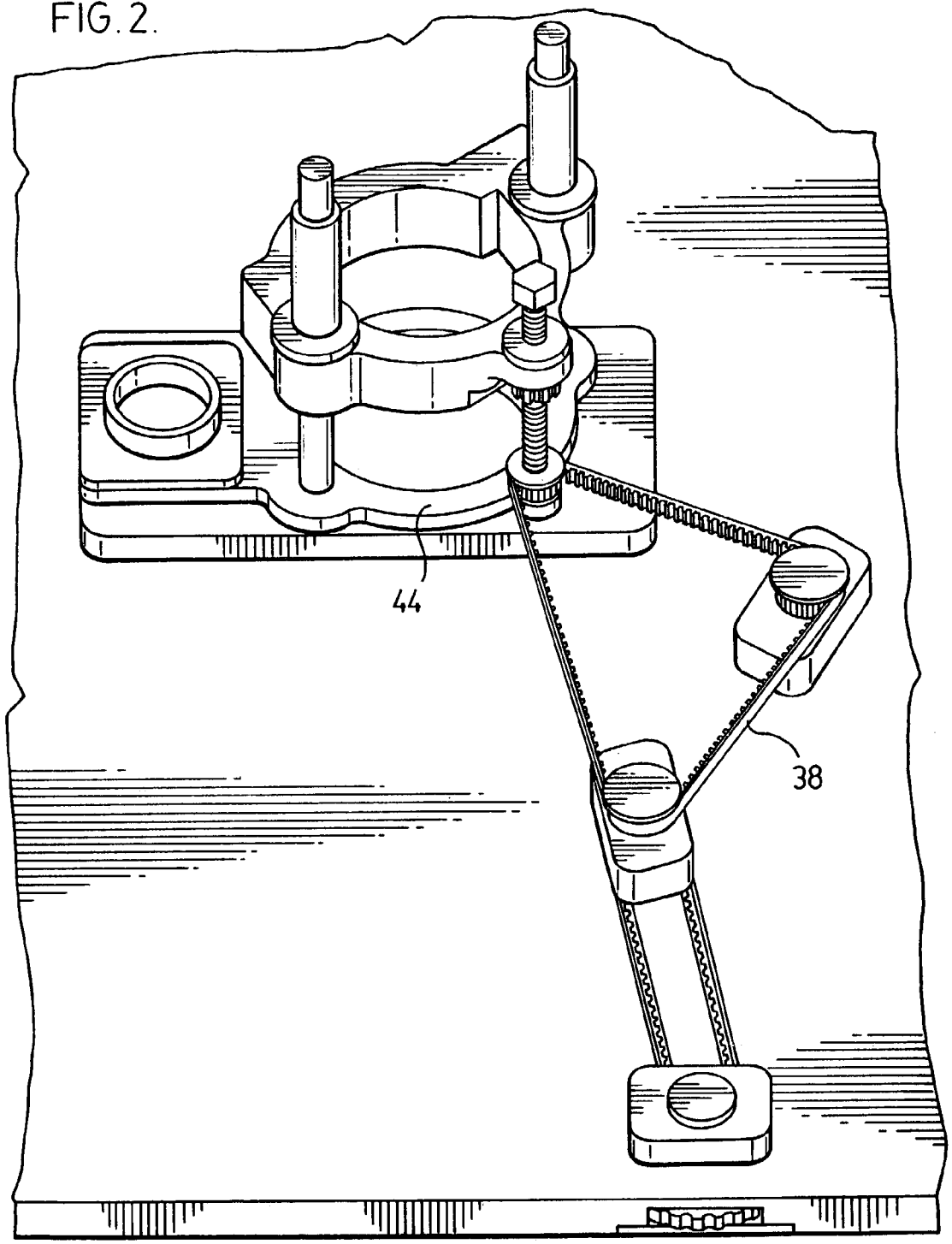
FIG. 2 is a perspective view of apparatus for adjusting the level of a power tool attached to the lower wall of the working surface together with a belt and block of the gauge.
Figure 4:
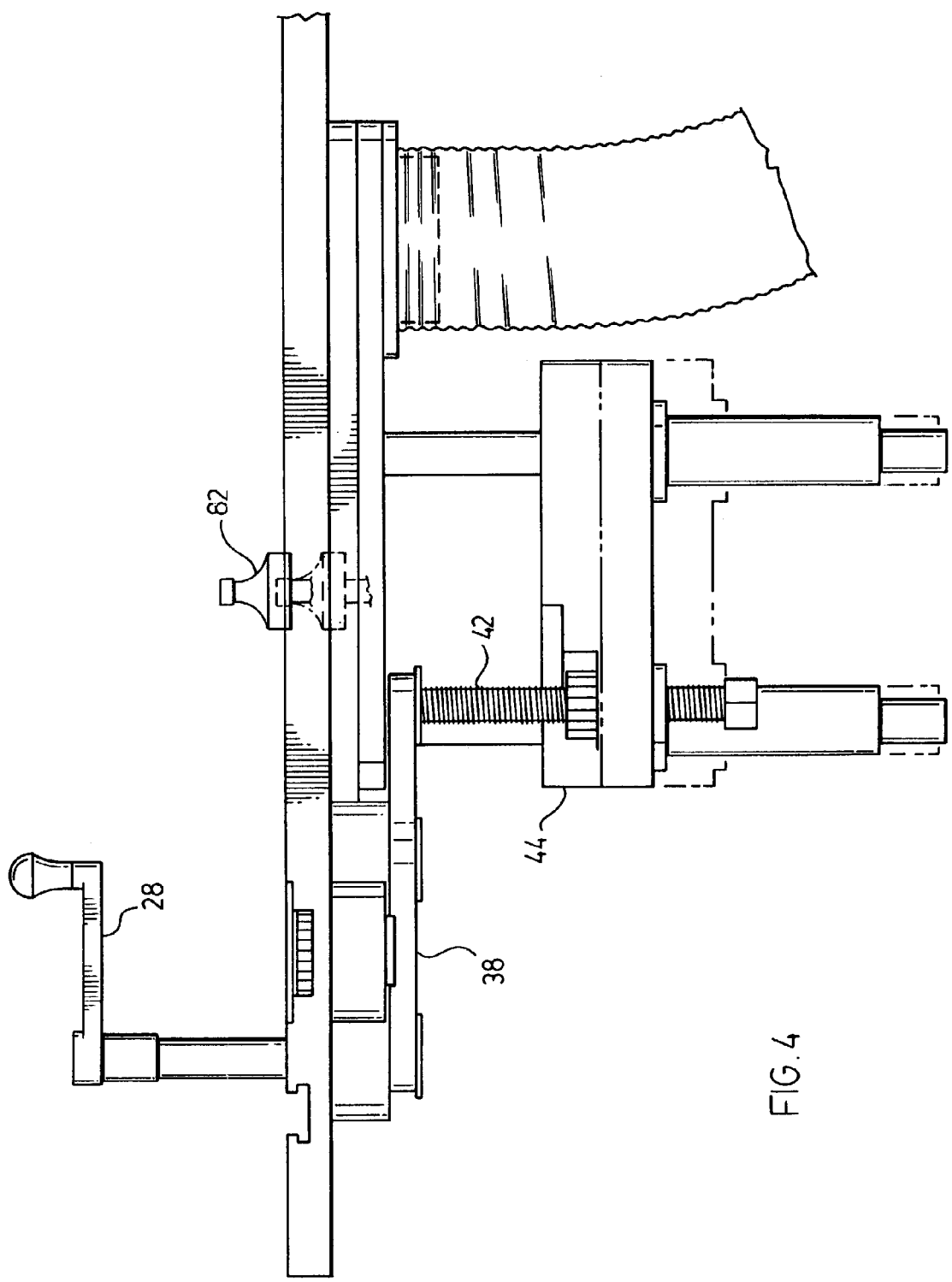
FIG. 4 is an elevation of the working surface, carriage and dust collector of the present invention.

The tube forms the hub of a gear wheel 36. As illustrated in FIGS. 2, 3 and 4, a belt 38 having teeth on its inner wall is trained around the gear wheel and around a second gear wheel 40. The latter gear wheel is keyed to a spindle 42 which is threadably received in an opening in carriage 44.

The carriage is part of a level adjusting apparatus and is described in the patent referred to above. A cutting tool such as a router or saw is clamped to the level adjusting apparatus and, as described in that patent the level adjusting apparatus is raised toward the plate or is lowered away from it by rotation of handle 28. As the handle rotates, so too do gear wheels 36, 40 with resulting rotation of spindle 42 and corresponding upward or downward movement of the carriage.

Figure 5:
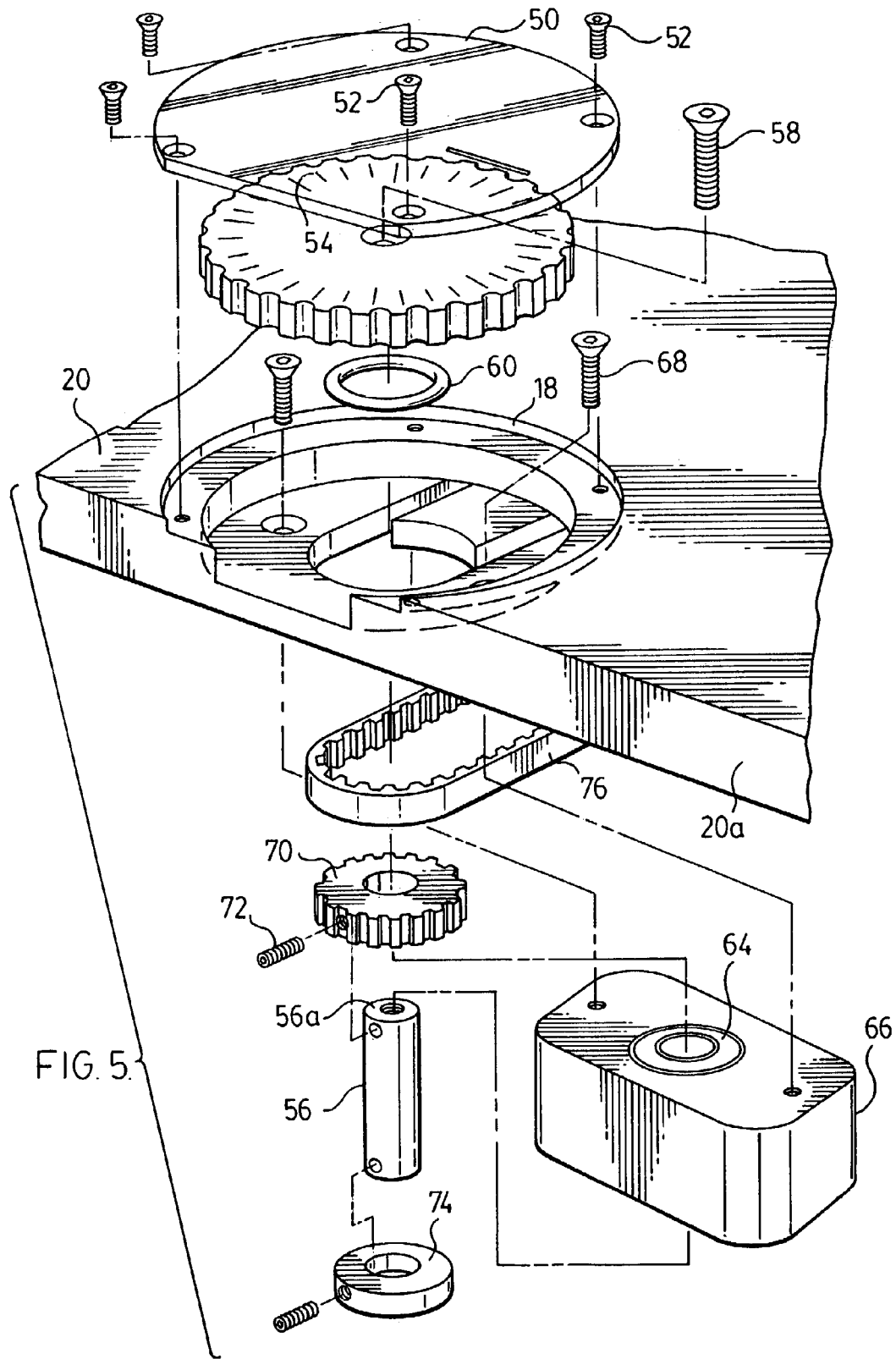
FIG. 5 is an exploded perspective view of the gauge of the invention.
Figure 6:
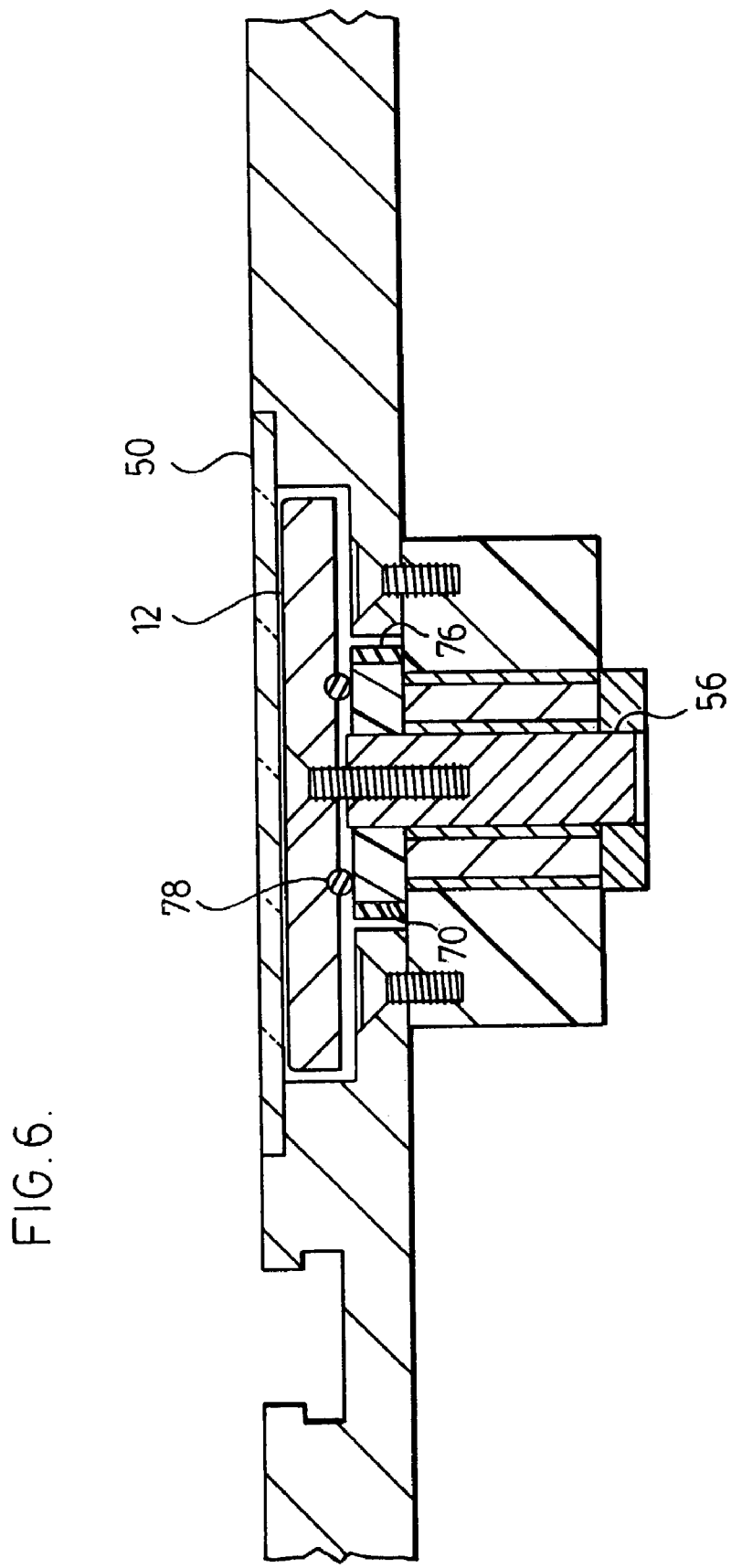
FIG. 6 is a section of the gauge.

With reference to FIGS. 5 and 6, the gauge includes a cover 50 which is attached to the working surface of plate 20 by means of screws 52. The cover is not shown in FIG. 1 since it obscures most of the dial. When the cover is attached, its upper surface is flush with the working surface of the plate. The dial is thus beneath the working surface.

A portion of the outer wall of the cover is curved to conform to the shape of the outer wall of recess 18. The remainder of the outer wall of the plate is straight and that portion is flush with the side edge 20a of the plate when the cover is attached to the plate. A mark or pointer 54 is painted or etched on the plate adjacent to the straight portion and that mark cooperates with the scale on the dial in the manner described below.

As previously indicated, dial 12 is disposed in the recess beneath cover 50. The dial is attached to a cylinder 56 by means of a screw 58 which passes through a circular opening in the dial and into engagement with a threaded bore in the cylinder. A polymeric gasket in the form of an O-ring 60 is disposed between the dial and a gear wheel 70.

The cylinder is received in a bearing 64 in a block 66. The block is bolted to the lower wall of the plate by means of screws 68. Gear wheel 70 is attached to the upper portion of cylinder 56 by a threaded stud 72. An annular collar 74 is attached to the cylinder beneath the block by the same means and serves to maintain the cylinder in the bearing. A belt 76 having teeth on its inner wall is trained around gear wheel 70.

Figure 7:
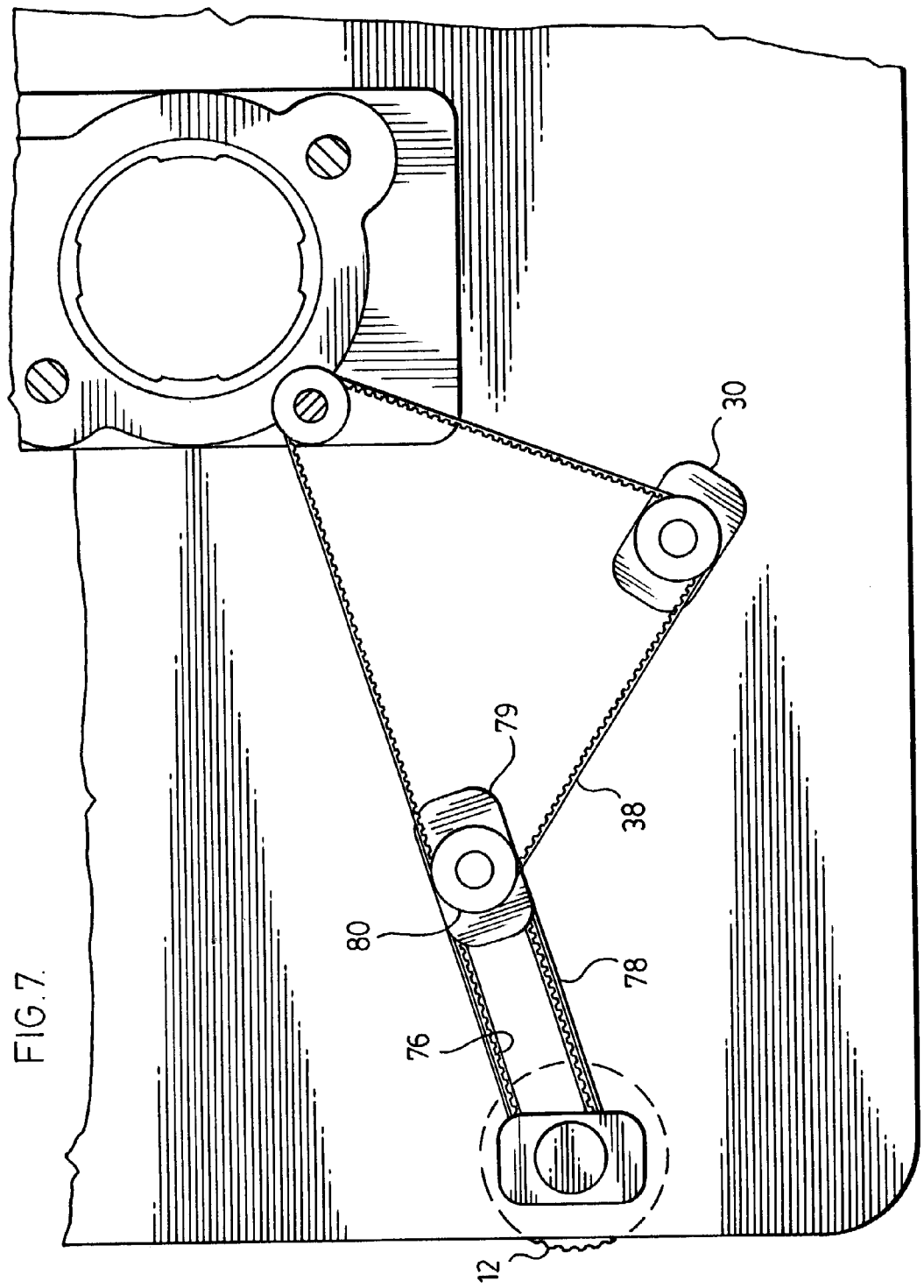
FIG. 7 is a view of the lower wall of the working surface in conjunction with belts which operatively interconnect the gauge, the apparatus for adjusting the level of the power tool and the carriage.

With reference to FIGS. 6 and 7, gear wheel 70 is accommodated in a groove 78 in the lower wall of the plate. Belt 76 likewise is accommodated in the groove. The belt extends from gear wheel 70 to a second gear wheel (not illustrated) which is keyed to an axle mounted in bearings in block 79. A third gear wheel 80 is also keyed to the axle. Belt 38 which is driven by the handle is trained around the third gear wheel 80.

With reference to FIGS. 4 and 7, the level of cutting implement 82 is adjusted by means of handle 28. Rotation of the handle will cause belt 38 to turn spindle 42 with resulting raising or lowering of carriage 44. The router or rotary saw on the carriage will similarly ascend or descend with corresponding raising or lowering of the bit or saw blade. Rotation of the handle will also cause a corresponding rotation of dial 12 since belt 38 causes belt 76 to turn. The dial will indicate how far the carriage has moved up or down.

The O-ring functions to produce a so-called "slip fit" or clutch between the dial and gear wheel 70. The pressure exerted on the O-ring by the dial and the gear wheel ensures that the O-ring causes the two to move together when the handle is being rotated. If however, the dial is rotated manually, the O-ring will allow the dial to slip so that such movement does not cause any movement in the level of the carriage. Pressure on the O-ring by the dial can be varied by tightening and loosening screw 58 as illustrated in FIG. 5 to ensure that the O-ring operates in this manner.

The O-ring acts as a clutch because it operates to activate and deactivate the connection between the dial and the gear wheel. Rotation of the handle by hand causes a like rotation of the dial but rotation of the dial by hand does not cause the handle to rotate. Rather, the handle remains stationary when the dial is rotated manually and so too does the carriage. This is because the O-ring allows the dial to slip relative to the gear wheel.

In operation the gauge serves to measure the amount of travel of the carriage, upward or downward. To this end before the handle is moved, the dial is rotated by hand until the pointer indicates zero. Such rotation will cause no movement of the carriage or the handle because of the O-ring. The handle is then rotated manually to cause the carriage to move up or down. Such movement will cause a corresponding movement of the dial and the extent of the movement will be indicated by the pointer.

Figure 8:
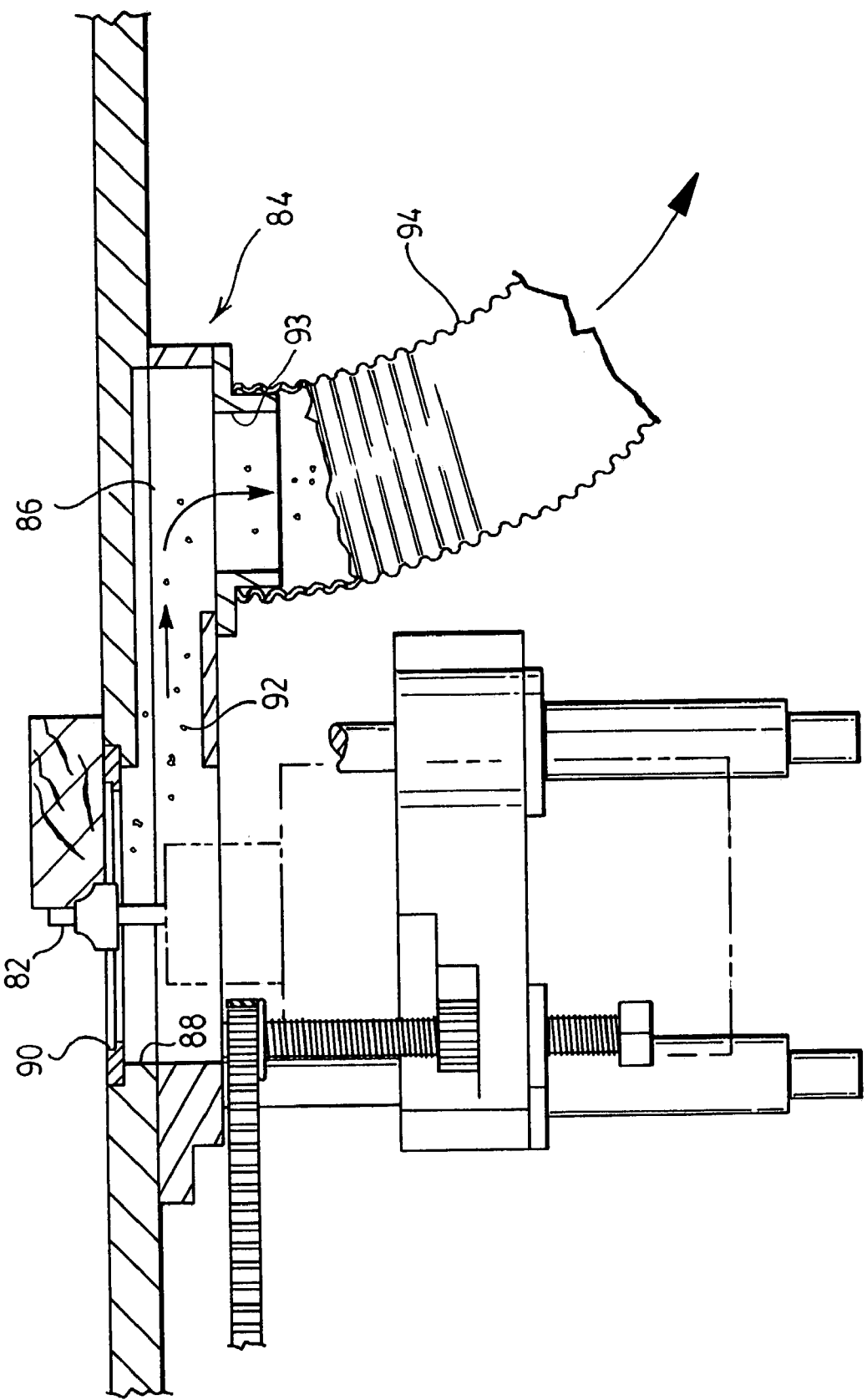
FIG. 8 an elevation of the working surface, dust collector and carriage.
Figure 9:
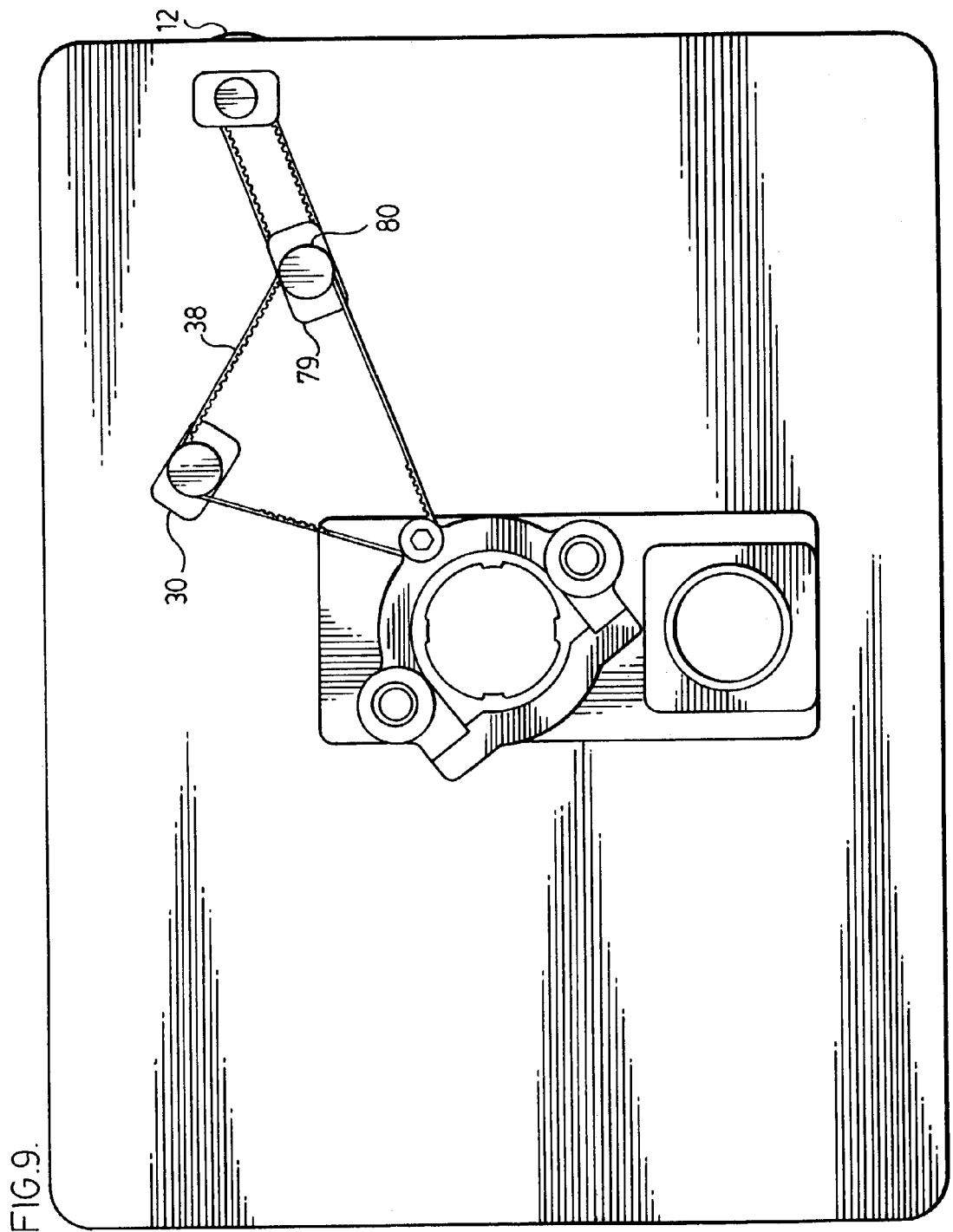
FIG. 9 is a view of the lower wall of the dust collector, carriage, and belts.

With reference to FIGS. 1, 8 and 9, a dust collector, generally 84, is attached to the lower wall of plate 20. The cleaner includes a hollow chamber 86 which is fastened to the lower wall of the plate above the level adjusting apparatus. There is an opening 88 in the chamber through which the cutting implement 82 and tool extend. The dust collector has a mouth 90 which surrounds the cutting implement and into which saw dust, wood chips and shavings and other debris 92 fall. The chamber has an exhaust port 93 to which a flexible hose 94 is attached.

A fan (not illustrated) causes air to flow through the chamber in the direction of the arrows from the mouth to the exhaust port. Debris generated during routing or sawing of a work piece is carried outwardly of the chamber in the stream of air.

It will be understood, of course, that modifications can be made in the gauge and the dust collector of the invention without departing from the scope and purview of the invention as defined in the claims which follow.

I claim:

1. In a level adjusting apparatus for adjusting the level of a tool having an implement for cutting a piece of work on a working surface on which the work to be cut is placed, a carriage mounted beneath said working surface and adapted to support said tool, and means for altering the level of said carriage, the improvement for measuring the extent of alteration in the level of said carriage comprising:
   a gauge operatively connected to said altering means; and
   a clutch for selectively activating and deactivating said operative connection such that said operative connection is deactivated when said gauge is manually rotated and is activated when said altering means is activated, wherein said clutch is a gasket operable to causes said gauge to activate when said altering means is activated but inoperable to cause said altering means to activate when said gauge is manually activated.

2. The apparatus of claim 1 wherein said gauge includes a dial, said apparatus further including connecting means for connecting said dial to said altering means, said gasket being compressed by said dial.

3. The apparatus of claim 2 further including means for adjusting the force of compression applied to said gasket by said dial.

4. The apparatus of claim 1 wherein said gauge includes a dial marked with a scale, said operative connection includes gear means, said gasket being disposed in a space between said dial and said gear means and being compressed thereby.

5. The apparatus of claim 4 further including means for altering the size of the space between said dial and said gear means such that the force of compression applied to said gasket can be adjusted.

6. The apparatus of claim 1 wherein said gauge is manually rotatable and has a dial marked with a scale and having a pointer for indicating said changes on said dial; one of said dial and said pointer being operatively connected to said altering means.

7. The apparatus of claim 1 wherein said dial is mounted in a recess formed in said working surface and is no higher than said working surface.

8. The apparatus of claim 7 wherein said working surface is defined by an upper wall of a plate, said plate having side walls which extend downwardly from said upper wall, said dial extending horizontally outwardly from said side wall.

9. The apparatus as claimed in claim 1, wherein said working surface has a side edge and said gauge extends outwardly of said side edge.

10. The apparatus as claimed in claim 9, wherein said gauge is disposed beneath said working surface.

11. In a level adjusting apparatus for adjusting the level of a tool having an implement for cutting a piece of work on a working surface on which the work to be cut is placed, a carriage mounted beneath said working surface and adapted to support said tool such that said cutting implement projects above said working surface, means for altering the level of said carriage, and a handle for activating said altering means, the improvement for measuring the extent of alteration of the level of said carriage comprising:
   a gauge having a dial marked with a scale for measuring changes in the level of said carriage and being manually rotatable;
   a pointer for indicating said changes on said dial; one of said dial and said pointer being operatively connected to said altering means; and
   a clutch for selectively activating and deactivating said operative connection such that said operative connection is deactivated when said dial is manually rotated and is activated when said altering means is activated,
   wherein said clutch is a gasket operable to causes said gauge to activate when said altering means is activated but inoperable to cause said altering means to activate when said gauge is manually activated.

12. The apparatus as claimed in claim 11 wherein said dial is rotatable relative to said working surface and said pointer is immovable relative thereto.

13. The apparatus as claimed in claim 11 wherein said pointer is rotatable relative to said working surface and said dial is immovable relative thereto.

14. The apparatus as claimed in claim 11 wherein said working surface has a side edge, said dial being rotatable relative to said working surface and extending outwardly from said side edge.

15. The apparatus as claimed in claim 11, wherein said working surface has a side edge and said gauge extends outwards of said side edge.

16. The apparatus as claimed in claim 15, wherein said gauge is disposed beneath said working surface.

* * * * *